Jan. 15, 1946.  E. L. HARDER  2,393,043
MINIMUM-VOLTAGE NETWORK AND SYSTEM
Filed Oct. 30, 1942
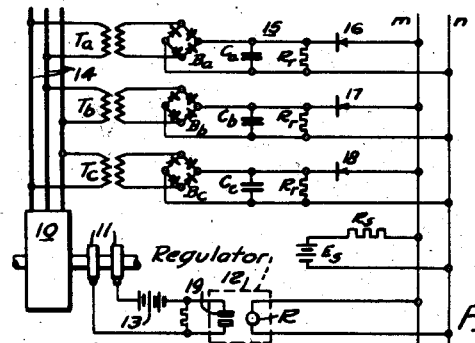
Fig. 1.
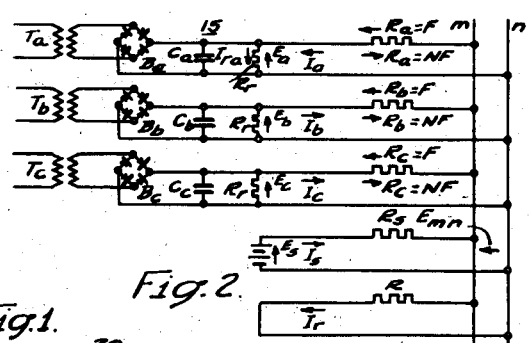
Fig. 2.
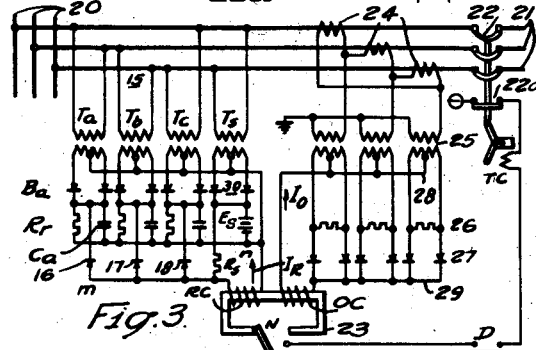
Fig. 3.
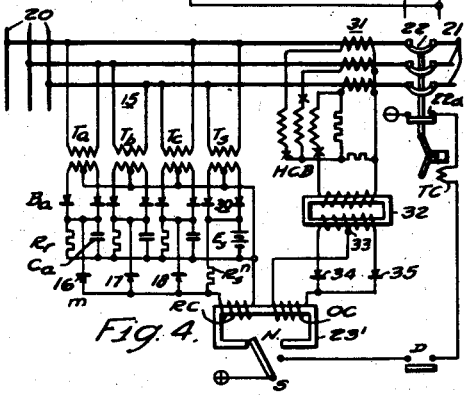
Fig. 4.
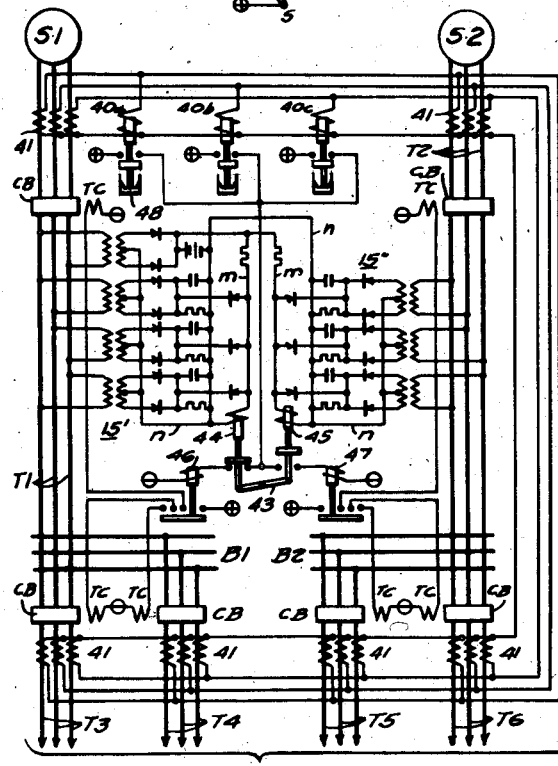
Fig. 5.
Fig. 6.
INVENTOR
Edwin L. Harder.
BY
ATTORNEY Patented Jan. 15, 1946

2,393,043

UNITED STATES PATENT OFFICE 2,393,043

MINIMUM-VOLTAGE NETWORK AND SYSTEM

Edwin L. Harder, Forest Hills, Pa., assignor to Westinghouse Electric Corporation, East Pittsburgh, Pa., a corporation of Pennsylvania Application October 30, 1942, Serial No. 463,973

24 Claims. (Cl. 175—294)

My invention relates to voltage-responsive devices which are designed to respond to the smallest of two or more voltages, and also to polyphase lines which are subject to single-phase faults. In one of its aspects, my invention relates to apparatus for responding to whichever phase of a polyphase electrical quantity is lowest in magnitude. Another aspect of my invention relates to a minimum-voltage network for obtaining a smallest-voltage response.

Heretofore, whenever a low-voltage-response has been required, in a polyphase system, it has been obtained either in a single-phase-responsive device, or in a polyphase-responsive device, or in a single-phase element energized from a phase-sequence selective-network. In polyphase systems or devices in which a single-phase voltage-response was not acceptable, because of the possibility of a single-phase fault occurring on any one of the phases, it has been necessary to choose either a polyphase voltage-response or a phase-sequence voltage-response, both of which are subject to certain disadvantages, among which may be mentioned a none-too-high speed of response and a none-too-low cost of manufacture. This is true, for example, in quick-response excitation-systems, which have been known since 1927, as shown in the Evans et al. Patent 1,692,495, wherein it was shown to be desirable to quickly increase the excitation of a synchronous generator or condenser, at times of a single-phase fault on a polyphase system. It is not satisfactory to excite the voltage-regulator from a single phase of the line-voltage, because, if this were done, a single-phase fault on some other phase might, under some circumstances, produce a momentary voltage-rise on one of the unfaulted phases, which would cause the quick-response excitation-system to start to rapidly decrease the excitation, when an increase was actually required. This difficulty has been overcome by resort to a polyphase-responsive voltage-regulator. Similarly, in the various single-element protective relays which have been known heretofore, for polyphase lines, where it has been necessary to utilize voltage-restraint, or a voltage-response of any sort, it has likewise been necessary to resort to the polyphase voltage-response, in order to secure useful results.

In accordance with my present invention, I utilize a minimum-voltage response, that is, a response to the smallest of two or more independently varying voltages, or other electrical quantities, and specifically, in the case of three-phase systems, a response to the smallest of the three line-voltages, either line-to-line voltages, or line-to-neutral voltages, or some other polyphase electrical quantity of the line.

An object of my invention, therefore, is to provide a polyphase system having a minimum-voltage-responsive device, which may be either a voltage-regulator or the restraint-part of an impedance relay, directional relay, or differential relay, or an undervoltage relay, or some other protective relaying device, either mechanical or tube-type.

A further object of my invention is to provide a novel minimum-voltage network, in which the terminals of a voltage-responsive device are connected to two or more unidirectional-voltage sources, through serially connected rectifiers which enable the source having the lowest voltage to freely draw off enough current from the terminals of the voltage-responsive device, so as to bring down the voltage of the voltage-responsive device to a value closely approaching the lowest control-voltage or connected source, whereas the reverse-current blocking-effect of the serially connected rectifiers prevents substantial current-flow in the reverse-direction, when the connected control-voltage is higher than the voltage appearing across the terminals of the voltage-responsive device.

With the foregoing and other objects in view, my invention relates to the structures, apparatus, combinations, systems and methods hereinafter described and claimed, and illustrated in the accompanying drawing, wherein:

Figure 1 is a diagrammatic view of circuits and apparatus illustrating my invention as being applied to a minimum-voltage-responsive device in the form of a voltage-regulator for a quick-response excitation-system for a polyphase synchronous machine, Fig. 2 is an equivalent-circuit diagram which will be referred to in the mathematical analysis of the minimum - voltage - selecting network shown in Fig. 1, Fig. 3 is a diagrammatic view of circuits and apparatus illustrating my invention as applied to a single-element relaying system for a polyphase line, utilizing a single impedance relay which is actuated in response to the largest phase-current of the line, and which is restrained in response to the smallest phase-voltage of the line, Fig. 4 is a similar view, except that the relay is actuated in response to a phase-sequence quantity derived from the polyphase line-voltage, Fig. 5 is a diagrammatic view of circuits and apparatus illustrating the application of my invention to a relaying system in which a comparison is made between the minimum voltage appearing in any phase of one polyphase bus and the minimum voltage appearing in any phase of another polyphase bus, and Fig. 6 is a diagrammatic view of circuits and apparatus illustrating the use of my invention in connection with an under-voltage fault-detecting relay, and also illustrating the utilization of a tube-type of relay, as distinguished from a mechanical-type relay.

In Fig. 1, I have illustrated my invention in connection with a three-phase synchronous dynamo-electric machine 10, having an excitation-system represented by the slip-rings 11, the voltage-regulator 12, and the source of exciting-current energy 13. The primary windings of the synchronous machine 10 are connected to a three-phase line 14.

In accordance with my invention, as shown in Fig. 1, I provide a minimum-voltage-selective network 15, for responding to the smallest of the three line-voltages, which are derived by means of three potential-transformers $T_a$, $T_b$, $T_c$. The three derived line-voltages are rectified, through rectifier-bridges $B_a$, $B_b$ and $B_c$, the outputs of which are supplied to three rectified-current resistors $R_r$, $R_r$ and $R_r$, so as to produce, in the several resistors $R_r$, a unidirectional voltage-drop proportional to the magnitude of the corresponding phase-voltage of the line 14. Ordinarily, some sort of voltage-smoothing means is desirable, for smoothing out the ripples in the rectified current, and to this end I have illustrated filter-capacitors $C_a$, $C_b$ and $C_c$, shunting the respective resistors $R_r$, and intended to be symbolic of any desired ripple-suppressing means, a number of which are known to the art.

My minimum-voltage network 15 is also provided with a pair of output-terminals $m$, $n$ which are the terminals of a relay R or other voltage-responsive device which is intended to be responsive to the smallest of the three control-voltages appearing across the three rectified-current resistors $R_r$. The output-terminals $m$, $n$ of the network 15, in Fig. 1, are in the general case, also energized from an auxiliary unidirectional-current source of poor voltage-regulation, by which is meant a source of unidirectional voltage which decreases with increasing current, which is represented, in Fig. 1, by a battery or other constant-voltage source $E_s$ having a serially connected resistance. $R_s$, or other impedance, either constant, or non-linearly responsive to the current-flow. The three line-voltage-controlled resistors $R_r$ are severally connected, in as many parallel-connected branch-circuits, across the output terminals $m$, $n$ of the network 15, in the same polarity as the auxiliary source $E_s$, that is, with the positive terminals of all of the sources connected to the network-terminal $m$, for example, except that, in the case of the three control-voltage resistors $R_r$, three serially connected rectifiers 16, 17 and 18, such as small contact-type rectifiers, or other asymmetrically conducting circuit-means, are respectively interposed in the circuit-connections, one in each, so as to provide a relatively free or good-conducting path for current flowing from the network-terminals $m$, $n$ to any one of the three control-voltage resistors $R_r$, but interposing a relatively high resistance, or even substantially an open-circuit effect, for preventing current from freely flowing in the reverse direction.

In the particular system shown in Fig. 1, the relay R is the voltage-coil of the voltage-regulator 12, which is utilized to control, in some manner, the vibrating-contacts 19 of the regulator.

The operation of the minimum-voltage network 15 of Fig. 1 will best be understood by reference to the equivalent-circuit diagram of Fig. 2, in which the serially connected rectifiers 16, 17 and 18 have been replaced by their equivalent resistances $R_a$, $R_b$ and $R_c$, respectively, having a small resistance-value F in the forward direction, and a high resistance-value NF in the reverse-direction, as indicated by the arrows, N being the rectification-ratio. The relay R is represented, in Fig. 2, by its resistance R. The voltages appearing across the three control-voltage resistances $R_r$ are designated $E_a$, $E_b$, $E_c$, respectively, with the understanding that the subscript $a$ is applied to whichever one of three voltages happens to be the lowest, so that, if these three voltages $E_a$, $E_b$, and $E_c$ are not all equal, it is always assumed that $E_a$ designates the lowest of the three control-voltages.

In Fig. 2, the network-voltage is $$E_{mn} = \frac{\frac{E_a}{R_a} + \frac{E_b}{R_b} + \frac{E_c}{R_c} + \frac{E_s}{R_s}}{\frac{1}{R_a} + \frac{1}{R_b} + \frac{1}{R_c} + \frac{1}{R_s} + \frac{1}{R}} \quad (1)$$

As long as $E_a$, which is the designation applied to the smallest of the three controlling-voltages, is less than $E_{mn}$, $$R_a = F \quad (2)$$

Since F is small as compared to R, F will draw enough current to bring down $E_{mn}$ to a value close to $E_a$, so that $E_{mn}$ will be less than either one of the two larger controlling-voltages $E_b$ or $E_c$, so that $$R_b = R_c = NF \quad (3)$$

Equation 1 thus becomes $$E_{mn} = \frac{\frac{E_a}{F} + \frac{E_b + E_c}{NF} + \frac{E_s}{R_s}}{\frac{1}{F} + \frac{2}{NF} + \frac{1}{R_s} + \frac{1}{R}} \quad (4)$$

In order for $E_a$ to be less than $E_{mn}$, it must be less than the voltage $E_{0a}$ which the network would have had without the $E_a$-branch. Thus $$E_{0a} = \frac{\frac{F}{R_s} E_s + \frac{1}{N}(E_b + E_c)}{\frac{F}{R_s} + \frac{F}{R} + \frac{2}{N}} > E_a \quad (5)$$

This imposes an upper limit on $E_a$, above which the network-voltage $E_{mn}$ will not be responsive to $E_a$. This upper limit of $E_a$ may be designated, $$E_{max} = \frac{\frac{F}{R_s} E_s + \frac{1}{N}(E_b + E_c)}{\frac{F}{R_s} + \frac{F}{R} + \frac{2}{N}} \quad (6)$$

In order that the controlling-voltage $E_a$ may be dependent upon the alternating-current voltage of the transformer $T_a$, and substantially independent of the network-voltage $E_{mn}$ (so that $E_a$ will control $E_{mn}$, rather than the other way around), it is necessary, in the particular system shown in Fig. 2, that the current $I_a$ which is fed from the network-terminals $m$, $n$ to the terminals of the bridge-connected resistance $R_r$ which is energized from the lowest-voltage potential-transformer $T_a$ shall be less than the energizing-current $I_{ra}$ which is fed into said resistance $R_r$ from said transformer $T_a$, so as to determine $E_a = I_{ra} R_r$. Thus $$I_a < I_{ra} \tag{7}$$

whence $$\frac{E_{mn} - E_a}{F} < \frac{E_a}{R_r} \tag{8}$$

Substituting from (4) and solving, $$E_a > \frac{\frac{F}{R_s} E_s + \frac{1}{N}(E_b + E_c)}{\left(\frac{F}{R_s} + \frac{F}{R} + \frac{2}{N}\right)\left(1 + \frac{F}{R_r}\right) + \frac{F}{R_r}} \tag{9}$$

This imposes a lower limit on $E_a$, below which the network-voltage $E_{mn}$ will not be controlled by $E_a$. This lower limit of $E_a$ may be designated, $$E_{min} = \frac{\frac{F}{R_s} E_s + \frac{1}{N}(E_b + E_c)}{\left(\frac{F}{R_s} + \frac{F}{R} + \frac{2}{N}\right)\left(1 + \frac{F}{R_r}\right) + \frac{F}{R_r}} \tag{10}$$

Dividing (6) by (10), and rearranging the terms, $$\begin{aligned}
\frac{E_{max}}{E_{min}} &= \frac{\left(\frac{F}{R_s} + \frac{F}{R} + \frac{2}{N}\right)\left(1 + \frac{F}{R_r}\right) + \frac{F}{R_r}}{\frac{F}{R_s} + \frac{F}{R} + \frac{2}{N}} \\
&= 1 + \frac{F}{R_r} + \frac{1}{\frac{R_r}{R_s} + \frac{R_r}{R} + \frac{2R_r}{NF}} \\
&= 1 + \frac{F}{R_r} + \frac{R}{R_r} \cdot \frac{1}{1 + \frac{R}{R_s} + \frac{2R}{NF}} \\
&= 1 + \frac{F}{R_r} + \frac{R}{\left(1 + \frac{R}{R_s}\right)R_r} \cdot \left(1 - \frac{1}{1 + \frac{N}{2}\left(\frac{F}{R_s} + \frac{F}{R}\right)}\right)
\end{aligned} \tag{11}$$

The ratio of the measured voltage $E_{mn}$ to the control-voltage $E_a$ is found, from (4) and (6), to be $$K = \frac{E_{mn}}{E_a} = \frac{1 + \frac{E_{max}}{E_a}\left(\frac{F}{R_s} + \frac{F}{R} + \frac{2}{N}\right)}{1 + \frac{F}{R_s} + \frac{F}{R} + \frac{2}{N}} \tag{12}$$

The relay-response $E_{mn}$ is proportional to the control-voltage $E_a$ within a certain accuracy which we may designate as $\pm P$ percent, over the range from $E_a = E_{max}$ to $E_a = E_{min}$. A low percentage of error, $P$, is desired, both in relays which are required to respond accurately to $E_a$ over a considerable range, $E_{max}$ to $E_{min}$, and also in undervoltage or dropout relays in which the rate of change in the relay-voltage $E_{mn}$ should be as fast as possible, in comparison to the rate of change of the controlling-voltage $E_a$.

By successively substituting $E_a = E_{max}$ and $E_a = E_{min}$ in (12), and dividing the results, we find that $$\begin{aligned}
Q = \frac{100 - P}{100 + P} &= \\
1 - \frac{2P}{100 + P} = \frac{K_1}{K_2} &= \frac{1 + \frac{F}{R_s} + \frac{F}{R} + \frac{2}{N}}{1 + \frac{E_{max}}{E_{min}}\left(\frac{F}{R_s} + \frac{F}{R} + \frac{2}{N}\right)} \\
&= 1 - \frac{\left(\frac{E_{max}}{E_{min}} - 1\right)\left(\frac{F}{R_s} + \frac{F}{R} + \frac{2}{N}\right)}{1 + \frac{E_{max}}{E_{min}}\left(\frac{F}{R_s} + \frac{F}{R} + \frac{2}{N}\right)}
\end{aligned} \tag{13}$$

Substituting from (11) and solving for $P$, $$\frac{P}{100} = \frac{F}{2R_r + F} = \frac{F}{2R_r} - \left(\frac{F}{2R_r}\right)^2 + \left(\frac{F}{2R_r}\right)^3 - \text{etc.} \tag{14}$$

The fraction $F/R_r$ will inherently be small, and hence as shown by Equation 14, the error $P$ will be small. This is so, because the forward-resistance $F$ of the rectifier 16 which is interposed between the network-voltage $E_{mn}$ and the control-voltage $E_a$ will naturally be made as small as practicable, while the bridge-connected resistance $R_r$ will have to be made large enough to avoid imposing an excessive volt-ampere burden $W_r$ on the potential-transformer $T_a$. When $E_a = E_b = E_c$, or $E_a = (E_b + E_c)/2$, this potential-transformer burden $W_r$ will be approximately equal to, $$W_r = \frac{(E_b + E_c)^2}{4R_r} \tag{15}$$

Since $F/R_r$ is thus small, Equation 11 shows that the spread between $E_{max}$ and $E_{min}$ is dependent mainly upon $$\frac{R}{R_r} \cdot \frac{1}{1 + \frac{R}{R_s} + \frac{2R}{NF}}$$

Obviously, the smaller the spread between $E_{max}$ and $E_{min}$, in Equation 11, the smaller may be the relay-resistance $R$ in comparison to the bridge-connected resistance $R_r$, thus increasing the relay-energy, which is, $$W = \frac{E_{mn}^2}{R} \tag{16}$$

From the Equation 11, it is very evident that, for a given ratio of $E_{max}$ to $E_{min}$, over which the relay is to be responsive, and for a mechanical relay, which usually needs a maximum energy-input $W$ into the relay at any given relay-voltage $E_{mn}$, (as distinguished from a tube-type relay), it is necessary for the relay-resistance $R$ to be as small as possible, in comparison to the bridge-connected resistance $R_r$, which can be accomplished only by making $2R/NF$ and $R/R_s$ as small as possible in Equation 11. This means making $N$ and $R_s$ as large as possible, as will now be discussed.

To make $N$ large, means to choose a good rectifier for the serially connected rectifier 16 which is interposed between the network-voltage $E_{mn}$ and the control-voltage $E_a$.

To make $R_s$ as large as possible, it could be made infinite, which is to say that the source $E_s$ could be omitted, except for the requirement as to the maximum control-voltage $E_{max}$ to which the relay must respond. With $R_s$ infinite, Equation 6 shows that $E_{max}$ cannot be larger than $(E_b + E_c)/(2 + NF/R)$; and the higher the rectification-ratio $N$, the smaller will be the fraction $1/(1 + NF/2R)$.

For any relay which is required to begin to respond to the smallest control-voltage $E_a$ before $E_a$ drops to a value as low as $(E_b + E_c)/(2 + NF/R)$, it is necessary to utilize the source $E_s$; and hence, for serving such a relay, $R_s$ cannot be made infinite.

For a network in which the source $E_s$ is required, in order to make the network responsive to a sufficiently high maximum-value $E_{max}$ of the control-voltage $E_a$, the network-constants may advantageously be selected, if desired, so as to obtain a maximum relay-energy $W$ at any desired relay-voltage $E_{mn}$. If it is desired, for example, to make the relay-energy $W$ as large as possible when the control-voltage $E_a$ has its maximum value $E_{max}$ at which $E_a$ will exercise any control over the relay-voltage $E_{mn}$, the relay energy W under these conditions may be obtained by substituting from Equations 4 and 6 in Equation 16; and the conditions for a maximum relay-energy W may be obtained by putting $$\frac{dW}{dR}=0$$

yielding, $$R_s=\frac{1}{\frac{1}{R}-\frac{2}{NF}}=\frac{NFR}{NF-2R} \qquad (17)$$

This means that if the source $E_s$ and its serially connected resistance $R_s$ are used, and if the relay-energy W is to be as large as possible, the reverse-current resistance NF of the serially connected rectifiers 16, 17 and 18 must be more than twice the relay-resistance R—perhaps at least four times as much, in any practical case.

Substituting from (17) in (11), we find that $$R=2R_r\left(\frac{E_{max}}{E_{min}}-1\right)-2F \qquad (18)$$

And substituting from (17) in (6), we find that (19)

$$E_s=\frac{2E_{max}-\frac{R}{NF}(E_b+E_c)}{1-\frac{2R}{NF}}=\frac{2NFE_{max}-R(E_b+E_c)}{NF-2R}$$

For the particular case in which it is required that the relay shall begin to respond to the smallest control-voltage $E_a$ when $E_a$ first begins to drop below $E_a=E_b=E_c$, $E_{max}$ will be $(E_b+E_c)/2$, and Equation 19 reduces to $$E_s=(E_b+E_c)\left(1+\frac{1}{\frac{NF}{R}-2}\right)=(E_b+E_c)\cdot\frac{NF-R}{NF-2R} \qquad (20)$$

Equations 17, 18 and 20 thus show the essential design-characteristics of a network designed to provide a maximum energy-input into the relay when the three control-voltages $E_a$, $E_b$, and $E_c$ are all equal, the network being also designed so that it is able to respond to $E_a$ when it first starts to drop below $E_b$ or $E_c$, that is, below $(E_b+E_c)/2$.

Where the potential transformers $T_a$, $T_b$ and $T_c$ are connected to the different phases of a constant-voltage line, which is the normal case, and where the network is not required to respond to the lowest control-voltage $E_a$ until it drops to some value below its normal maximum value, which is the normal line-voltage, it is possible to utilize a storage-battery for the auxiliary source $E_s$, and to make the voltage of this storage-battery somewhat less than the normal line-voltage, or somewhat less than $(E_b+E_c)/2$. Under these circumstances, under normal line-voltage conditions, the three line-voltages will trickle-charge the battery $E_s$ through the back-current-flow through the three serially connected rectifiers 16, 17 and 18 of Fig. 1, which are represented by the resistances $R_a$, $R_b$ and $R_c$ in Fig. 2, thus saving the cost of a separate trickle-charging outfit for the battery. In other instances, a direct-current station-bus may be utilized for the auxiliary source $E_s$.

In the operation of my invention as shown in Fig. 1, the regulator-coil R is thus impressed with a voltage which is responsive to the smallest of the three phases of the polyphase voltage of the three-phase line 14, the manner of this response having fully been explained. Under normal line-voltage conditions, the vibrating regulator-contacts hold the voltage of the synchronous machine 10 at any desired value. If, now, a single-phase fault occurs on the line 14 to which the machine 10 is connected, the line-voltage may not always immediately reduce on both of the sound phases, but it will be sure to be immediately reduced on the faulted phase, and my minimum-voltage network causes the regulator 12 to respond to the smallest voltage, which will be the voltage of the faulted phase, thus causing the regulator to promptly start the excitation-response in the proper direction. Thus, when the regulator-contact 19 is closed, the excitation of the machine 10 is being quickly increased. In this manner, the benefits of quick-response excitation are obtained with a minimum-voltage response without necessitating a special regulator which is responsive to a polyphase voltage.

In Fig. 3, I have illustrated my invention as applied to the protective relaying apparatus of a three-phase system which is represented by a three-phase bus 20 having a three-phase line 21 connected thereto through a circuit breaker 22. The circuit breaker 22 is provided with an auxiliary breaker-switch 22a, and a trip-coil TC. The relaying system shown in Fig. 3 is a single-element relaying system utilizing an impedance-relay 23 which is illustrated as a polarized relay having an operating coil OC and a restraining coil RC. The relay-contacts of the impedance-relay 23 are utilized to energize the trip coil TC of the breaker through an auxiliary relaying-contact D, which may be the contact of a directional relay or other discriminatory relay for supervising the action of the impedance-relay.

The operating coil OC of the impedance-relay 23 in Fig. 3 is energized from a bank of delta-connected line-current transformers 24, which energize three auxiliary transformers 25, the secondary circuits of which are loaded with resistances 26, the voltage of which is rectified by means of half-wave rectifiers 27. The secondary windings of the auxiliary transformers 25 are provided with mid-taps 28 which are connected to one terminal of the operating coil OC, while the six rectifiers 27 are connected to the other terminal 29 of the operating coil OC. In this manner, the operating coil OC is energized in proportion to the largest phase of the three delta-phases of the line-current, in the manner described and claimed in my Patent 2,242,950, granted May 20, 1941.

The restraining coil RC of the impedance-relay 23 in Fig. 3 is energized from my novel minimum-voltage network 15, in the manner already described for Figs. 1 and 2. In Fig. 3, I have shown a trickle-charging means for the auxiliary battery $E_s$, said trickle-charging means comprising an auxiliary potential-transformer $T_s$, and a trickle-charging rectifier 30. In Fig. 3, instead of utilizing bridge-connected rectifiers $B_a$, etc., for deriving the line-voltage-responsive unidirectional control-voltages, I have shown, by way of illustration, a known type of double-half-wave rectifier-connection utilizing the midpoint of the transformer-secondary as one of the terminals $n$ of the rectified-current output.

In the operation of the new type of impedance-relay 23 which is shown in Fig. 3, it will be observed that the operating coil OC is always energized in response to the line-current phase having the highest magnitude, which will, of course, be the faulted phase, in the event of a single-phase fault, while the restraining coil RC is always energized in response to the line-voltage phase having the lowest magnitude, which means, of course, the phase on which the fault occurs.

Thus, a single line-to-ground fault on phase A will be accompanied by a fault-current in the phase-A (or top) line-conductor 21, causing this phase of the line-current to be a maximum, and energizing the operating coil OC accordingly. At the same time, the delta voltages of the potential transformers T$_a$ and T$_c$ will dip, by equal amounts, causing the restraining coil RC to be energized in accordance with this voltage. The impedance relay 23 thus operates as if it were an alternating-current relay having an operating coil OC connected to the phase-A line-current transformer 24, and having a restraining coil connected to either the phase-AB or the phase-CA line-voltage transformer T$_a$ or T$_c$.

Or a double-phase fault, on phases B and C, for example, will be accompanied by a fault-current flowing in line-conductor phases B and C, causing the line-current in these phases to be a maximum and accordingly energizing the operating coil OC. At the same time, the delta BC voltage of the potential transformer T$_b$ will be a minimum, accordingly energizing the restraining coil RC.

Thus, my single relay 23 gives the same impedance-response as would have been obtained if three single-phase impedance-relays had been utilized, one for each of the three phases, because my single impedance-relay 23 always operates as if it were such a single-phase impedance-relay connected in whichever phase happens to be the faulted phase. It will be understood, of course, that any desired impedance-relay connections may be utilized, using the word "impedance" in its broad sense which includes reactance-responsive relays, and utilizing any of the known or desired combinations of line-voltage and line-currents, not being limited to the use of delta current and in-phase delta voltage, as in the particular impedance-relay connections illustrated in Fig. 3.

In Fig. 4, I have illustrated my invention as applied to a single-element relaying system which is similar to that which has already been described in connection with Fig. 3, except that the impedance relay 23' has its operating coil OC energized in response to a selective-phase-sequence current-responsive filter-means which is designed to drive a relaying-current which is responsive to any one of a plurality of different kinds of faults on different phases of the line, such as the HCB filter which is described and claimed in my Patent 2,183,646, granted December 19, 1939. This HCB current-network comprises a bank of star-connected line-current transformers 31, energizing a suitable network of resistances and mutual impedances, the voltage of which is preferably transformed by means of an auxiliary transformer 32, which may, or may not, be of a saturating type, to limit the maximum relaying current which is obtained under very severe fault-conditions. Since a polarized relay 23' is illustrated in Fig. 4, it is necessary to rectify the output of the HCB network, which is accomplished by bringing out a mid-tap 33 from the secondary winding of the auxiliary transformer 32 and utilizing two half-wave rectifiers 34 and 35, as shown.

In the operation of the system shown in Fig. 4, the impedance element 23' operates the same as a phase-sequence-responsive overcurrent relay, such as that shown in my Patent 2,183,646, with the addition of a minimum-voltage restraint, that is, with restraint which is responsive to the smallest of the three line-voltages, thus producing an impedance-measuring effect, and making the relay selectively responsive to the particular phase which is the most affected by the fault on the line.

Fig. 5 illustrates the utilization of my invention to solve a difficulty which arose in connection with two three-phase buses B1 and B2 which were located at a station in which the buses were supplied with various terminals which were tied together, in parallel-circuit arrangement, only through long feeders connected to a distribution-network, so as to involve a certain amount of impedance in the paralleling connections between the buses. Thus, the bus B1 is illustrated as being energized from a source S1 which is connected to the three-phase bus-terminal T1, while the bus B2 is shown as being energized from a source S2, connected to the three-phase bus-terminal T2. The bus B1 is shown as supplying two three-phase feeders T3 and T4, which extend out to the distribution-network while the bus B2 is shown as supplying two other feeders T5 and T6, which also extend out to the distribution-network. The bus-arrangement was a double-bus, double-breaker scheme, however, so that any one of the six terminals T1 to T6 might be connected to either one of the two buses B1 and B2, and no current-transformers were available for use in differential bus-protection, except the six banks of current-transformers 41 connected in the several terminals or lines T1 to T6, respectively. By connecting together the corresponding phases of the six banks of current-transformers, it was possible to differentially energize the differential-current relays 40$_a$, 40$_b$ and 40$_c$, one for each phase, so as to respond to a fault on one of the two buses B1 and B2, but it was impossible, by this means, to discriminate as to which of the two buses was faulted.

Under these circumstances, as shown in Fig. 5, I utilize two of my minimum-voltage networks 15' and 15", one connected to each of the buses B1 and B2. For convenience of illustration, I have simplified the wiring diagram by connecting the minimum-voltage networks to the bus-terminals T1 and T2 respectively, but it will be understood that the connections would normally be made directly to the respective buses B1 and B2 themselves. The respective minimum-voltage networks 15' and 15", in Fig. 5, each select the minimum voltage on its own bus, and these two minimum voltages are compared by means of a differential relay 43 having two differentially operating coils 44 and 45, respectively, so that the differential relay 43 drops down on the side having the minimum voltage, thus responding to the bus which is faulted, because the voltage of the faulted phase on the faulted bus will be lower than any of the phase-voltages on the sound bus.

The minimum-voltage-responsive differential-relay 43 of Fig. 5 represents a broadly new principle in relaying, in that a single single-phase current- or voltage-comparing relay is utilized in connection with two phase-selecting networks which are associated with two different points between which a differential-relay operation is desired, in a polyphase electrical system, the phase-selecting networks being utilized to select the phase which is distinctively different, and hence the phase which is immediately affected by a single-phase fault, at its point in the system. Thus, if a differential current-responsive effect is desired, the phase having the maximum current may be selected, at each relaying point, by apparatus such as that shown at 29 in Fig. 3; and if a differential voltage-responsive effect is desired, the phase having the minimum voltage will be selected, at each relaying point, by apparatus such as is shown at 15, 15', 15'' and 15''', in the various figures. In any event, the distinctively different phases which are selected by the two networks are applied to a single differential relay, so that the single relay will automatically compare the fault-conditions at the two relaying-points, so as to select the point which is the most affected by the fault. This is a new relaying principle, and I desire Fig. 5 to be understood as being illustrative of the same.

The contacts of the minimum-voltage-responsive differential-relay 43 are utilized, in Fig. 5, in series with the paralleled contacts of the three current-differential relays 40a, 40b and 40c to energize either one or the other of two contactor-switches 46 and 47, which are utilized to energize the trip-coils TC of all of the circuit breakers CB connected to whichever bus is the faulted bus, one contactor-switch 46 being provided for the bus-B1 breakers, while the other contactor-switch 47 controls the breakers connected to the bus B2. In order to make sure that the differential-current relays 40a, 40b and 40c shall not have a faster operating-time than the minimum voltage differential-relay 43, I have illustrated the differential-current relays as being provided with time-delay means which are symbolically indicated by means of dashpots 48, which may be utilized as occasion demands.

In all of the embodiments of my invention, the minimum-voltage-responsive device may be any kind of voltage-responsive device, whether mechanical or tube-type, or whether polarized or non-polarized. A polarized relay is usually preferred, to a non-polarized relay, as it requires less energy-input, but my invention is not limited to a polarized relay, or to a relay at all, as distinguished, for example, from a voltage-responsive device of any kind, such as the voltage-regulator shown in Fig. 1, or in general, the resistance R shown in Fig. 2.

I wish it also to be understood that the general discussion given in connection with the network of Fig. 2 is applicable to all of the embodiments of the invention, so that the auxiliary voltage-source $E_s$ may be utilized, or omitted, or given any voltage-value desired, in connection with any of the figures of the drawing. In like manner, instead of having three variable control-voltages $E_a$, $E_b$ and $E_c$, I might have only one variable voltage $E_a$, which is compared with one fixed voltage $E_s$, so that the variable voltage $E_a$ will control the relay-voltage $E_{mn}$ whenever $E_a$ is less than $E_{mn}$, but not otherwise. It is also possible, either with or without $E_s$, to have two, or four, or any other number of control-voltages such as those illustrated at $E_a$, $E_b$ and $E_c$.

In Fig. 6, I have illustrated my invention applied to a tube-type undervoltage fault-detector relaying-system utilizing a gas-filled hot-cathode grid-glow tube 50 having an anode 51, a grid 52, and a heated cathode 53, with the anode-cathode circuit connected in the tripping-circuit of the circuit-breaker 22, through the directional relay D or other discriminatory relay, as described in connection with Fig. 3. The grid 52 of the tube is connected to the negative terminal $n$ of the minimum-voltage network 15''', while the positive network-terminal $m$ is connected to the cathode 53 of the tube, so that the grid 52 is kept negative, with respect to the cathode 53, by a voltage which is controlled by the output-voltage $E_{mn}$ of the network. The tube 50 has the characteristic of remaining non-conductive as long as the grid 52 is sufficiently negative with respect to the cathode 53. When one of the three line-voltages drops to a sufficiently low value, the negative bias on the grid 52 will decrease to a value low enough to permit the grid to glow, thus establishing a tripping-circuit as soon as the other relay-contact D is closed, and thereafter the tube remains conducting, independently of its grid-potential, until its plate-anode circuit is interrupted by some other means, such as the auxiliary breaker-switch 22a.

In the particular minimum-voltage network 15''' shown in Fig. 6 I have not utilized an auxiliary source $E_s$, but have utilized the back-current-flow of the serially connected rectifiers 17 and 18 of the high-voltage phases to supply the extremely small charging-current necessary to maintain the negative grid-voltage on the tube, it being understood that the grid-cathode circuit of the tube operates as an extremely high resistance R in the equivalent-circuit diagram of Fig. 2.

I wish it to be understood, however, that the auxiliary source $E_s$ could be added, in Fig. 6, or it could be omitted in any of the other figures where the operating-conditions warrant such omission, and also that a mechanical-type under-voltage relay could be utilized, in Fig. 6, in place of the tube 50, or a tube-type relay could be utilized in place of the mechanical-type voltage-responsive devices in any of the other figures.

It will be understood, of course, from Equation 17, that whenever the source $E_s$ and its serially connected resistance $R_s$ is used, better operation may be obtained by making the relay-resistance R considerably less than the reverse-current rectifier-resistance NF, which may mean, in the case of a tube-relay, shunting the grid-cathode circuit with a loading-resistance in order to properly reduce the overall relay-resistance R.

The quick-acting voltage-regulator system which is shown in Fig. 1 is more particularly claimed in a divisional application Serial No. 512,443, filed December 1, 1943.

In connection with the broad idea of utilizing a minimum-voltage response to energize a voltage-responsive device so as to be responsive to the smallest phase of a polyphase electrical quantity, I wish my illustrations to be regarded as broadly indicative of any equivalent means to that end, as I believe that it is a new inventive concept to utilize a minimum-voltage response, in place of either a polyphase-energized torque-producing means or a polyphase-energized sequence-selective network, as a means for obtaining a response to a reduction in any one of the three line-voltages, regardless of which phase-voltage is the reduced voltage.

I desire, therefore, that the appended claims shall be accorded the broadest construction consistent with their language and the prior art.

I claim as my invention:

1. A voltage-responsive network comprising a pair of supply-voltage terminals, a pair of output-voltage terminals, a pair of control-voltage terminals, circuit-means including impedance for joining the pair of output-voltage terminals to the pair of supply-voltage terminals for providing a resistively conducting current-path for current flowing from the pair of supply-voltage terminals to the pair of output-voltage terminals, and an asymmetrically conducting circuit-means for joining the pair of output-voltage terminals to the pair of control-voltage terminals for providing a good-conductor current-path for current flowing from the pair of output-voltage terminals to the pair of control-voltage terminals but not for current flowing in the reverse direction, whereby, under operating conditions, when the voltage of the control-voltage terminals is less than the voltage of the output-voltage terminals, current flows from the pair of output-voltage terminals to the pair of control-voltage terminals and pulls down the voltage of the output-voltage terminals to a value approaching that of the control-voltage terminals.

2. A minimum-voltage network comprising a plurality of pairs of control-voltage terminals, a pair of output-voltage terminals, and a separate asymmetrically conducting circuit-means for joining the pair of output-voltage terminals to each of the several pair of control-voltage terminals for providing a good-conductor current-path for current flowing from the pair of output-voltage terminals to its associated pair of control-voltage terminals and for providing a resistively conducting current-path for current flowing from said associated pair of control-voltage terminals to the pair of output-voltage terminals, whereby, under operating conditions, current flows, at times, from the pair of output-voltage terminals to whichever pair of control-voltage terminals has the lowest control-voltage applied thereto from some externally connected circuit, pulling down the voltage of the output-voltage terminals to a value approaching said lowest control-voltage.

3. A minimum-voltage network comprising a pair of supply-voltage terminals, a plurality of pairs of control-voltage terminals, a pair of output-voltage terminals, circuit-means including resistance for joining the pair of output-voltage terminals to the pair of supply-voltage terminals for providing a resistively conducting current-path for current flowing from the pair of supply-voltage terminals to the pair of output-voltage terminals, and a separate asymmetrically conducting circuit-means for joining the pair of output-voltage terminals to each of the several pairs of control-voltage terminals for providing a good-conductor current-path for current flowing from the pair of output-voltage terminals to its associated pair of control-voltage terminals but not for current flowing in the reverse direction, whereby, under operating conditions, current flows, at times, from the pair of output-voltage terminals to whichever pair of control-voltage terminals has the lowest control-voltage applied thereto from some externally connected circuit, pulling down the voltage of the output-voltage terminals to a value approaching said lowest control-voltage.

4. A voltage-network comprising a source of unidirectional current having a voltage which decreases with increasing current, a voltage-responsive device connected thereto, a source of variable unidirectional control-voltage, and an asymmetrically conducting circuit-means for connecting said control-voltage source to the terminals of said voltage-responsive device for providing a good-conductor current-path for current flowing from the terminals of the voltage-responsive device to the control-voltage source but not for current flowing in the reverse direction.

5. A voltage-network comprising a plurality of sources of variable unidirectional control-voltages, a voltage-responsive device, and a separate asymmetrically conducting circuit-means for connecting each of the control-voltage sources to the voltage-responsive device in the same polarity for providing a good-conductor current-path for current flowing from the terminals of the voltage-responsive device to its associated control-voltage source and for providing a resistively conducting current-path for current flowing from said associated control-voltage source to the voltage-responsive device.

6. A voltage-network comprising a source of unidirectional current having a voltage which decreases with increasing current, a voltage-responsive device connected thereto, a plurality of sources of variable unidirectional control-voltages, and a separate asymmetrically conducting circuit-means for connecting each of the control-voltage sources to the voltage-responsive device in the same polarity as the first-mentioned source for providing a good-conductor current-path for current flowing from the terminals of the voltage-responsive device to its associated control-voltage source but not for current flowing in the reverse direction.

7. The invention as defined in claim 4, characterized by said control-voltage source comprising a source of alternating current, a rectifier energized therefrom, and a resistance energized with unidirectional current from said rectifier, the terminals of the resistance being connected to the asymmetrically conducting circuit-means, the network-constants being such that the current which is fed from the terminals of the voltage-responsive device to the terminals of the resistance which is also being energized from the control-voltage source, when the latter is low, is less than the energizing-current which is fed into said resistance from said control-voltage source.

8. The invention as defined in claim 5, characterized by each of said control-voltage sources comprising a source of alternating current, a rectifier energized therefrom, and a resistance energized with unidirectional current from said rectifier, the terminals of the resistance being connected to the associated asymmetrically conducting circuit-means, the network-constants being such that the current which is fed from the terminals of the voltage-responsive device to the terminals of the resistance which is also being energized from a control-voltage source, when the latter is low, is less than the energizing-current which is fed into said resistance from said control-voltage source.

9. The invention as defined in claim 6, characterized by each of said control-voltage sources comprising a source of alternating current, a rectifier energized therefrom, and a resistance energized with unidirectional current from said rectifier, the terminals of the resistance being connected to the associated asymmetrically conducting circuit-means, the network-constants being such that the current which is fed from the terminals of the voltage-responsive device to the terminals of the resistance which is also being energized from a control-voltage source, when the latter is low, is less than the energizing-current which is fed into said resistance from said control-voltage source.

10. A voltage-network comprising a storage-battery, a resistor, a voltage-responsive device, circuit-means for connecting the terminals of said voltage-responsive device to the terminals of said storage-battery through said resistor, a source of unidirectional control-voltage which is normally higher than the battery-voltage but which is subject to occasional voltage-dips to voltages lower than the voltage across the terminals of said voltage-responsive device, a rectifier having a low resistance to current-flow in the forward direction and having a high resistance to back-current, and circuit-means for connecting the terminals of said control-voltage source, through said rectifier, to the terminals of said voltage-responsive device in the same polarity as said battery, with the rectifier connected in such direction as to provide a low-resistance path for current flowing from the terminals of the voltage-responsive device to the terminals of the control-voltage source, whereby the forward-current-bow through the rectifier pulls down the voltage of the voltage-responsive device to a value approaching the control-voltage when the latter is less than the former, and whereby the back-current-flow through the rectifier trickle-charges the battery when the control-source voltage is higher than the battery-voltage.

11. A voltage-network for discriminating as to which one of three or more sources of unidirectional voltages has the lowest voltage, comprising a pair of terminals for each of said sources, a pair of network-terminals, and a plurality of parallel-connected branch-circuits, one for each source, connected across said pair of network-terminals, each branch-circuit including, in series with its source-terminals, a rectifier directed so as to preferentially conduct current in a direction against the voltage of its source.

12. A voltage-network for discriminating as to which one of three or more sources of unidirectional voltages has the lowest voltage, comprising an electro-responsive device, and a plurality of parallel-connected branch-circuits, one for each source, connected across terminals of said electro-responsive device, each branch-circuit including, in series with its source, a rectifier directed so as to preferentially conduct current in a direction against the voltage of its source.

13. The invention as defined in claim 11, characterized by each source comprising a resistor connected in its branch-circuit, a supply-circuit connected across the resistor, a source of control-current for said supply-circuit, and a rectifier in the supply-circuit for permitting current-flow in substantially only one direction.

14. The invention as defined in claim 12, characterized by each source comprising a resistor connected in its branch-circuit, a supply-circuit connected across the resistor, a source of control-current for said supply-circuit, and a rectifier in the supply-circuit for permitting current-flow in substantially only one direction.

15. A lowest-quantity-responsive apparatus comprising the combination, with a polyphase line, of means for deriving, from said line, a plurality of polyphase electrical quantities of which the one which is lowest in magnitude is to be selected for response, a separate conversion-means associated with each of the derived electrical quantities and having a pair of control-voltage terminals having a unidirectional voltage thereacross which is responsive to its electrical quantity, a unidirectional-current electro-responsive device, and a separate circuit-means including a serially connected rectifier for individually connecting each pair of control-voltage terminals to the terminals of said electro-responsive device in such manner as to freely draw current away from the terminals of the electro-responsive device to the lowest-voltage control-voltage terminals when the lowest control-voltage is lower than the voltage of the electro-responsive device, whereby, under such circumstances, the voltage of the electro-responsive device is brought down to a value approaching the lowest control-voltage.

16. The combination, with a polyphase line which is subject to single-phase faults, of a fault-responsive relay, means for deriving a plurality of different line-current-responsive quantities, means for applying to said fault-responsive relay a relaying-current dependent upon the highest of said line-current-responsive quantities, means for deriving a plurality of different line-voltage-responsive quantities, and means for applying to said fault-responsive relay a relaying-voltage dependent upon the lowest of said line-voltage-responsive quantities.

17. The combination, with a polyphase line which is subject to single-phase faults, of a fault-responsive relay, a selective-phase-sequence current-responsive filter-means associated with said line for deriving a relaying-quantity which is responsive to any one of a plurality of different kinds of faults on different phases of the line, means for deriving, from the line, a relaying-quantity which is responsive substantially to the lowest of the phase-voltages of the line, and means for utilizing these two relaying-quantiites in the energization of the relay whereby the relay selectively responds to the particular phase which is affected in a predetermined manner by the fault.

18. The combination, with a polyphase line which is subject to single-phase faults, of a fault-responsive relay, means for actuating the relay in response to the polyphase line-current, no matter which phase is faulted, and means for restraining the relay in response to the lowest of the phase-voltages of the line, whereby the relay selectively responds to the particular phase which is affected in a predetermined manner by the fault.

19. The combination, with a polyphase electrical system, of means for deriving, from each of two different points in said system, a relaying quantity which is responsive substantially to the phase which is distinctively different, in magnitude, from the other phases of an electrical line-quantity at that point, and relaying-means for comparatively responding to said two relaying quantities.

20. The combination, with a polyphase electrical system having two polyphase buses and polyphase connecting-means having sensible impedances for connecting said buses in parallel, of a differentially responsive protective relay for determining which of said two buses is faulted, in the event of a fault, and means for differentially energizing the relay in response to the lowest of the phase-voltages of the respective buses, whereby the relay selectively responds to the particular phase which is affected in a predetermined manner by the fault.

21. The combination, with a polyphase electrical system having circuit-interrupting sectionalizing-means for segregating a faulted portion of the system from the rest of the system, of a protective relaying-means for selectively energizing said sectionalizing-means in the event of a fault, an undervoltage relay, means for utilizing said undervoltage relay in controlling the operation of said protective relaying-means, and a minimum-voltage-responsive device, responsive to the system-voltage, for energizing said undervoltage relay in accordance with the lowest phase-voltage of the system, whereby, at times of a single-phase fault affecting any one of the phase-voltages of the system, the undervoltage relay will selectively respond to the particular phase which is the most affected by the fault.

22. A fault-responsive relay for selectively responding to a particular phase which is affected in a predetermined manner by a fault involving less than all the phases of a polyphase line to be protected, comprising means for deriving a current-responsive relaying-quantity dependent upon the line-current, means for deriving a set of polyphase voltage-responsive relaying-quantities dependent upon the line-voltage, conversion-means comprising a plurality of sources of variable unidirectional voltage-responsive control-voltages responsive to different phases of said set of polyphase voltage-responsive relaying-quantities, a voltage-network comprising a pair of minimum-voltage terminals, a separate asymmetrically conducting circuit-means for connecting each of the control-voltage sources to the minimum-voltage terminals in such manner as to freely draw current away from said minimum-voltage terminals to the lowest-voltage control-voltage terminals when the lowest control-voltage is lower than the voltage of the minimum-voltage terminals, and means for utilizing the current-responsive relaying-quantity and the voltage across said minimum-voltage terminals in the energization of said fault-responsive relay.

23. The invention as defined in claim 22, characterized by a source of unidirectional current having a voltage which decreases with increasing current, and means for connecting said source to said minimum-voltage terminals in such polarity as to feed current to said lowest-voltage control-voltage terminals.

24. The invention as defined in claim 22, characterized by said means for deriving said current-responsive relaying-quantity comprising a pair of maximum-voltage terminals for carrying said current-responsive relaying-quantity, and conversion-means and connecting-means for developing a plurality of variable unidirectional current-responsive control-voltages responsive to different phases of the polyphase line-current and for unidirectionally applying said current-responsive control-voltages in parallel-circuit relation to said pair of maximum-voltage terminals in such manner as to feed current to said maximum-voltage terminals substantially only from the largest of said current-responsive control-voltages.

EDWIN L. HARDER.